Aug. 21, 1928.

E. ECKROAT 1,681,526

CHAIN FASTENER

Filed July 27, 1927

Inventor

E. Eckroat.

By Clarence A. O'Brien
Attorney

Patented Aug. 21, 1928.

1,681,526

UNITED STATES PATENT OFFICE.

EMANUEL ECKROAT, OF SHENANDOAH, PENNSYLVANIA.

CHAIN FASTENER.

Application filed July 27, 1927. Serial No. 208,867.

This invention relates to fastening devices for chains and is adapted particularly for use in connection with the securing of the ends of automobile tire chains so as to retain the same upon position on the tire.

The invention has for an object to provide a fastener of this character which is formed independent of the links of the chain, thereby permitting the same to be secured to any one of the links at either end of the chain thereby enabling a more convenient adjustment for securing the chain in position.

Another object is to provide a device of this character of simple and practical construction, strong and durable, efficient and reliable in performance, adapted to be easily and quickly secured in position for attaching the opposite ends of a chain, inexpensive to manufacture, and otherwise well adapted for the purposes for which the same is intended.

Other objects and advantages reside in the special construction and combination of the various elements forming the invention, reference being had to the accompanying drawings forming a part hereof, wherein:—

Figure 1:
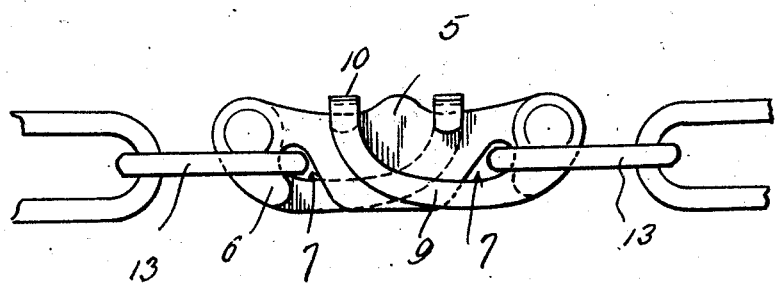
Figure 1 is a view in elevation showing the fastener in position for attaching the ends of a chain.

Referring now to the accompanying drawing wherein for the purpose of illustration I have disclosed a preferred embodiment of my invention, I provide a chain fastener comprising a plate member 5 of a substantially elongated formation, and having a pair of notches 7 formed in one side thereof adjacent its opposite ends, the inner ends of said notches extending slightly in a direction toward the adjacent ends of the plate wherein to form each end of the plate into substantially hook-shaped members 6.

Each end of the plate is provided with a transverse opening adapted to receive pins or bolts 8, each of said pins pivotally supporting one end of arcuate shaped arms 9 adapted to swing in a plane parallel with the faces of the plate, the arm at the opposite ends of the plate being disposed at the opposite faces of the plate and having their ends remote from their pivotal connection provided with hooks 10 for engagement with the edge of the plate opposite to the edge having the notches 7 formed therein, the arms, when arranged with the hooks in engaged position, serving to close the entrance to said notches.

Figure 2:
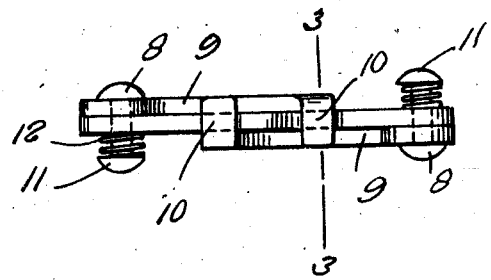
Figure 2 is a top plan view thereof.
Figure 3:
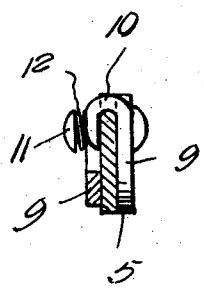
Figure 3 is a transverse vertical sectional view taken along a line 3—3 of Figure 2.

As more clearly illustrated in Figure 2 of the drawing, the pins 8 are of sufficient length to extend outwardly from the plate at one side, having heads 11 formed thereon adapted to support a coil spring 12 therebetween and the adjacent face of the plate. This arrangement permits a yielding transverse movement of the pin so that the arms 9 may be spaced sufficiently from the plate in order to permit the hooks 10 to be disengaged therefrom and allowing the arms to be swung into open position with respect to the notches.

With the arms arranged in open position, links 13 of a chain may be inserted in the notches and upon the swinging of the arms into a closed position, the links are thereby securely retained therewithin.

It will be observed from Figure 1 of the drawing that the width of the arms and the width of the hooks 6 at the position of engagement of the links 13 therewith, are substantially similar so that the arms and the hooks combine to carry the pulling force of the links.

In this manner it will be apparent that should either the arm or the end of the hook become broken that the other will still serve as an attaching means for the link to prevent the disengagement thereof from the plate.

It is obvious that the invention is susceptible of various changes in the shape, size and arrangement of the various parts, without departing from the spirit or scope of the appended claims, and I accordingly claim all such forms of the device to which I am entitled.

I claim:—

1. In a device of the class described, a plate having a plurality of notches formed along one edge thereof, means pivotally carried by the plate and adapted to be arranged in position with respect to said notches whereby to close the entrance to the same, and plate engaging means carried by the closure means adapted to engage the opposite edge thereof for retaining the parts in closed position.

2. In a chain fastener, a plate having a plurality of notches formed along one edge thereof and adapted to receive the links of the chain, arms pivotally mounted on the plate and plate engaging means carried by said arms and adapted to engage the opposite edge of the plate for arranging in position with respect to said notches whereby to close the entrance thereof.

3. In a chain fastener, a plate having a plurality of notches arranged along one edge thereof forming hooks at each end of the plate and adapted to receive chain links, pins extending transversely of the plate at each end, arcuate shaped arms pivotally carried on said pins, yieldable means permitting limited transverse movement of the arms, said arms being movable into position with respect to the notches whereby to retain the links therein and hooks formed on the arms engageable with the opposite edge of the plate.

In testimony whereof I affix my signature.

EMANUEL ECKROAT.